United States Patent
Sheehy et al.

(10) Patent No.: US 8,720,311 B2
(45) Date of Patent: May 13, 2014

(54) TOOL HOLDER

(75) Inventors: Thomas Harry Sheehy, Pine Valley, NY (US); Neil Andrew Moxey, Devon (GB)

(73) Assignee: Hardinge, Inc., Elmira, NY (US)

( * ) Notice: Subject to any disclaimer, the term of this patent is extended or adjusted under 35 U.S.C. 154(b) by 542 days.

(21) Appl. No.: 12/897,261

(22) Filed: Oct. 4, 2010

(65) Prior Publication Data

US 2011/0094355 A1    Apr. 28, 2011

Related U.S. Application Data

(60) Provisional application No. 61/248,135, filed on Oct. 2, 2009.

(51) Int. Cl.
  *B23B 29/24* (2006.01)
(52) U.S. Cl.
  USPC .................. 82/121; 82/131; 82/159; 29/35.5
(58) Field of Classification Search
  CPC ........ B23B 29/24; B23B 29/32; B23B 29/26; B23B 29/28
  USPC ............. 82/121, 131, 159, 161, 158; 29/35.5, 29/39, 40, 33 J, 27 R, 27 C
  IPC ....................... B23B 29/24, 29/32, 29/26, 29/28
  See application file for complete search history.

(56) References Cited

U.S. PATENT DOCUMENTS

| | | | |
|---|---|---|---|
| 2,697,611 A * | 12/1954 | Glasser .............................. | 279/6 |
| 3,101,020 A * | 8/1963 | Ditto ............................... | 82/158 |
| 4,478,117 A | 10/1984 | Brown et al. | |
| 4,706,351 A * | 11/1987 | Chuang ............................. | 29/39 |
| 5,820,098 A | 10/1998 | Miyano | |
| 6,003,415 A * | 12/1999 | Turner et al. .................... | 82/159 |
| 6,701,815 B2 | 3/2004 | Judas | |
| 7,243,407 B2 * | 7/2007 | Daris ............................ | 29/38 C |
| 2002/0066342 A1 | 6/2002 | Baumann et al. | |
| 2003/0029287 A1 | 2/2003 | Judas | |
| 2004/0009047 A1 | 1/2004 | Neumeier | |
| 2006/0196325 A1 * | 9/2006 | Sakai ............................. | 82/121 |
| 2007/0039148 A1 | 2/2007 | Neumeier | |
| 2009/0007406 A1 | 1/2009 | Sheehan et al. | |
| 2009/0133547 A1 | 5/2009 | Neumeier | |

FOREIGN PATENT DOCUMENTS

| | | | | |
|---|---|---|---|---|
| DE | 3930787 A1 | 3/1991 | | |
| DE | 4028030 A1 * | 5/1992 | ............. | B23B 29/24 |
| DE | 19958461 C1 | 3/2001 | | |

(Continued)

OTHER PUBLICATIONS

Office Action as issued for German Patent Application No. 102010037927.1, dated Dec. 27, 2012.

*Primary Examiner* — Andrea Wellington
*Assistant Examiner* — Ryan Rufo
(74) *Attorney, Agent, or Firm* — Pillsbury Winthrop Shaw Pittman LLP

(57) ABSTRACT

A combination live/dead tool holder for use on an indexing tool turret of a machine tool includes a live tool holder as well as a dead tool holder mount. The dead tool holder mount is configured to interchangeably mount to a variety of different dead tool holders. The tool holder includes a y-axis adjustment mechanism that facilitates adjustment of the position of the tool holder relative to the turret along the y axis (i.e., along a circumferential direction of the turret).

10 Claims, 6 Drawing Sheets

(56) References Cited

FOREIGN PATENT DOCUMENTS

| DE | 19940330 | C2 | 6/2001 | | |
|----|----------|----|--------|---|---|
| DE | 10139297 | C1 | 2/2003 | | |
| DE | 102004035263 | B3 * | 11/2005 | ............. | B23B 29/12 |
| IT | 1320590 | B1 | 12/2003 | | |
| JP | 2001079701 | A | 3/2001 | | |

* cited by examiner

TOOL HOLDER

CROSS REFERENCE

This application claims the benefit of priority from U.S. Provisional Patent Application No. 61/248,135, filed Oct. 2, 2009, titled "TOOL HOLDER," the entire contents of which are hereby incorporated by reference herein.

BACKGROUND OF THE INVENTION

1. Field of the Invention

The present invention relates generally to tool holders of the type used on indexing tool turrets of machine tools (e.g., mills, lathes, combination mill/lathes).

2. Description of Related Art

Various conventional machine tools (e.g., turning centers such as lathes, machining centers such as mills, combination turn/mill tools, combination mill/turn tools) utilize an indexing tool turret. A plurality of tool holders are mounted circumferentially around the turret. The turret is selectively rotated to place a desired one of the tool holders into an operative position for processing a work piece that is mounted to a spindle of the machine tool. Some machine tools have both a main spindle and a back spindle. The tools on the tool holders are each typically oriented to interact with work pieces on one of the main and back spindles.

The turret rim has surface features that mate with surface features of the tool holders to properly align the tool holders. Shims are occasionally used in an effort to adjust the position of a dead tool holder relative to the turret in the y-axis.

One tool holder includes two live tool mounts, one for use on the main spindle, and one for use on the back spindle. The live tool mounts extend in opposite z directions of the tool holder.

SUMMARY OF EMBODIMENTS OF THE INVENTION

One or more embodiments of the present invention provides a combination live/dead tool holder. The tool holder has a base constructed and shaped to be mounted to a rim of an indexing turret of a machine tool; a drive shaft connected to the base for rotational movement relative to the base about a drive shaft axis, the drive shaft being configured and shaped so as to be driven by a driving shaft of the turret; a live tool holder connected to the base, the live tool holder having a live tool mount that is rotatable relative to the base about a live tool holder axis, the tool mount being shaped and configured to releasably attach a tool to the live tool holder, the live tool mount being connected to the drive shaft such that rotation of the drive shaft rotates the live tool holder; a dead tool holder mount connected to the base; and a modular dead tool holder removably connected to the dead tool holder mount, the modular dead tool holder comprising a tool mount for releasably attaching a tool to the dead tool holder.

According to one or more of these embodiments, the tool holder is combined with a second modular dead tool holder that is mountable to the dead tool holder mount in place of the modular dead tool holder. The second modular dead tool holder has a second too mount for releasably attaching a tool of a tool type that is different than the tool type of the tool mount of the modular dead tool holder.

According to one or more of these embodiments, the tool mount is a tool mount adapted to attach to a first one of a square shank turning tool, a drill bit, or an indexable drill holder. The second tool mount is a tool mount adapted to attach to a different one of a square shank turning tool, a drill bit, or an indexable drill holder.

According to one or more of these embodiments, the live tool axis is perpendicular to the drive shaft axis.

According to one or more of these embodiments, the live tool holder and dead tool holder face away from each other so as to interact with work pieces mounted to different ones of a main and back spindle of the machine tool.

Another embodiment of the present invention provides a tool holder that includes a base constructed and shaped to be mounted to a rim of an indexing turret of a machine tool, the base defining an x-axis that extends radially away from the turret when the base is mounted to the turret, the base defining a z axis that is parallel to a pivotal axis of the turret, the base defining a y axis that is perpendicular to the x and z axes. The tool holder also includes an adjustable y axis alignment structure adjustably connected to the base so as to be positionable in a plurality of y axis positions relative to the base. The y axis alignment structure has a y axis key surface positioned and shaped to mate with a complimentary key surface of the turret rim so as to control the y axis position of the base relative to the turret. The tool holder also includes a tool mount for releasably attaching a tool to the tool holder.

According to one or more of these embodiments, the adjustable connection between the base and the adjustable y axis alignment structure comprises a first threaded element threadingly engaged with one of the base and alignment structure such that rotation of the first threaded element moves the first threaded element along a first threaded element axis relative to the one of the base and the alignment structure. The first threaded element operatively abuts the other of the base and alignment structure such that movement of the first threaded element in a first direction along the first threaded element axis forces the y axis alignment structure in a positive y axis direction relative to the base.

According to one or more of these embodiments, the first threaded element axis forms a skewed/acute angle with the x and y axes.

According to one or more of these embodiments, the adjustable connection between the base and the adjustable y axis alignment structure comprises a second threaded element threadingly engaged with the one of the base and alignment structure such that rotation of the second threaded element moves the second threaded element along a second threaded element axis relative to the one of the base and the alignment structure. The second threaded element operatively abuts the other of the base and alignment structure such that movement of the second threaded element in a first direction along the second threaded element axis forces the y axis alignment structure in a negative y axis direction relative to the base.

According to one or more of these embodiments, the tool holder also includes a fastener extending between the base and the adjustable y axis alignment structure. Fastening of the fastener prevents relative y axis movement between the base and the adjustable y axis alignment structure.

According to one or more of these embodiments, the adjustable y axis alignment structure comprises a first adjustable y axis alignment structure. The tool holder further comprises a second adjustable y axis alignment structure adjustably connected to the base so as to be positionable in a plurality of y axis positions relative to the base, the second y axis alignment structure having a y axis key surface positioned and shaped to mate with a complimentary surface of the turret rim so as to control the y axis position of the base relative to the turret, the first y axis alignment structure being disposed on an opposite z-direction side of the base as the second y axis alignment structure. Coordinated adjustment of the first and second first adjustable y axis alignment structures causes pure y-axis adjustment.

According to one or more of these embodiments, the tool holder is combined with a machine tool that includes an indexing turret having a rim and a turret pivotal axis. The rim has a plurality of tool holder stations, each of the tool holder stations having a y axis key surface. The machine tool also includes a machining spindle adapted to mount to a work piece to be machined on the machine tool. The tool holder is mounted to one of the tool holder stations such that the y axis key surface of the adjustable y axis alignment structure mates with the y axis key surface of the associated tool holder position of the rim. The y axis of the base is tangent to a circumferential direction of the turret. The z axis of the base is parallel to the turret pivotal axis. The x axis of the base extends in a radial direction of the turret.

According to one or more of these embodiments, the tool holder includes at least one x axis alignment structure connected to the base.

According to one or more of these embodiments, the tool holder includes a drive shaft connected to the base for rotational movement relative to the base about a drive shaft axis, the drive shaft being configured and shaped so as to be driven by a driving shaft of the turret. The tool holder also includes a live tool holder connected to the base, the live tool holder having a live tool mount that is rotatable relative to the base about a live tool holder axis, the tool mount being shaped and configured to releasably attach a tool to the live tool holder, the live tool mount being connected to the drive shaft such that rotation of the drive shaft rotates the live tool holder. The tool holder also includes a dead tool holder mount connected to the base. The tool holder also includes a modular dead tool holder removably connected to the dead tool holder mount, the modular dead tool holder comprising a tool mount for releasably attaching a tool to the dead tool holder.

According to one or more of these embodiments, the first threaded fastener is positioned and arranged relative to the alignment structure such that the alignment structure moves less than 0.001 inches (or 0.002 or 0.0005 inches) in the positive y axis direction per full rotation of the first threaded fastener causing movement in the first direction.

Another embodiment of the present invention provides a tool holder that includes a base constructed and shaped to be mounted to a rim of an indexing turret of a machine tool, the base defining an x-axis that extends radially away from the turret when the base is mounted to the turret, the base defining a z axis that is parallel to a pivotal axis of the turret, the base defining a y axis that is perpendicular to the x and z axes. The tool holder also includes a tool mount for releasably attaching a tool to the tool holder, and an adjustable y axis alignment structure adjustably connected to the base so as to be positionable in a plurality of y axis positions relative to the base. The y axis alignment structure has a y axis key surface positioned and shaped to mate with a complimentary key surface of the turret rim so as to control the y axis position of the base relative to the turret. The tool holder also includes a first threaded element threadingly engaged with one of the base and alignment structure such that rotation of the first threaded element moves the first threaded element along a first threaded element axis relative to the one of the base and the alignment structure between: (i) an operatively abutting position in which the first threaded element operatively abuts the other of the base and alignment structure, and (ii) an operatively retracted position in which the first threaded element does not operatively abut the other of the base and alignment structure. When the first threaded element is in its operatively abutting position, movement of the first threaded element in a first direction along the first threaded element axis forces the y axis alignment structure to move in a positive y axis direction relative to the base. When the first threaded element is in its operatively abutting position, the first threaded element prevents the alignment structure from moving in a negative y axis direction unless the first threaded element is moved in a second direction along the first threaded element axis. When the first threaded element is in its operatively retracted position, the first threaded element does not prevent the alignment structure from moving in the negative y axis direction.

According to one or more of these embodiments, the tool holder also includes a second threaded element threadingly engaged with the one of the base and alignment structure such that rotation of the second threaded element moves the second threaded element along a second threaded element axis relative to the one of the base and the alignment structure between: (i) an operatively abutting position in which the second threaded element operatively abuts the other of the base and alignment structure, and (ii) an operatively retracted position in which the second threaded element does not operatively abut the other of the base and alignment structure. When the second threaded element is in its operatively abutting position, movement of the second threaded element in a first direction along the second threaded element axis forces the y axis alignment structure to move in the negative y axis direction relative to the base. When the second threaded element is in its operatively abutting position, the second threaded element prevents the alignment structure from moving in the positive y axis direction unless the second threaded element is moved in a second direction along the second threaded element axis. When the second threaded element is in its operatively retracted position, the second threaded element does not prevent the alignment structure from moving in the positive y axis direction.

According to one or more of these embodiments, when the first and second threaded elements are both in their operatively abutting positions, the alignment structure can only be moved along the y axis if one of the first and second threaded elements is moved in its respective second direction.

These and other aspects of various embodiments of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the invention, the structural components illustrated herein are drawn to scale. It is to be expressly understood, however, that the drawings are for the purpose of illustration and description only and are not intended as a definition of the limits of the invention. In addition, it should be appreciated that structural features shown or described in any one embodiment herein can be used in other embodiments as well. As used in the specification and in the claims, the singular form of "a", "an", and "the" include plural referents unless the context clearly dictates otherwise.

BRIEF DESCRIPTION OF THE DRAWINGS

For a better understanding of embodiments of the present invention as well as other objects and further features thereof, reference is made to the following description which is to be used in conjunction with the accompanying drawings, where.

DETAILED DESCRIPTION OF EXEMPLARY EMBODIMENTS OF THE INVENTION

Figure 3:
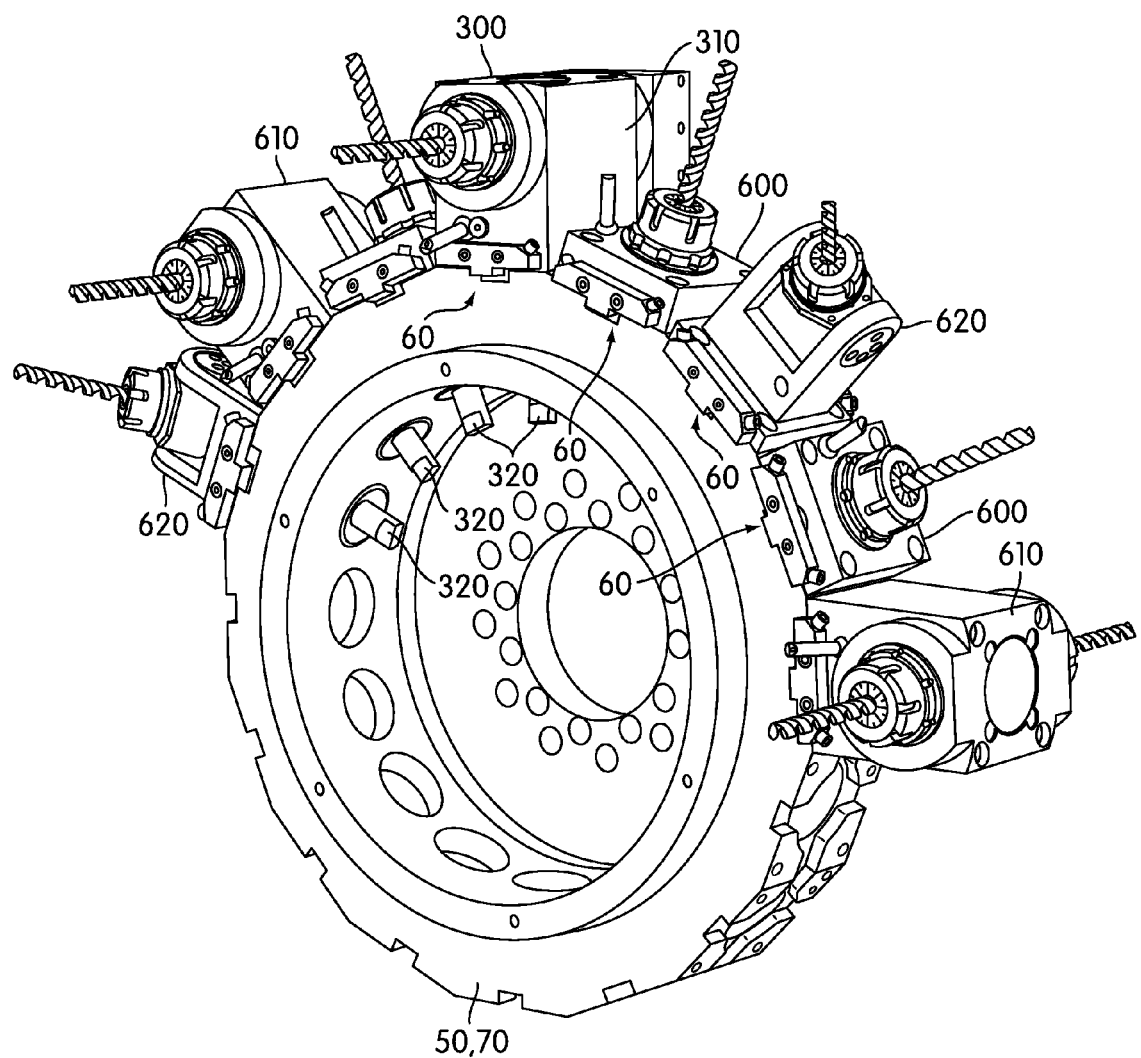
FIG. 3 is a perspective view of a turret with a plurality of tool holders mounted thereto.
Figure 4:
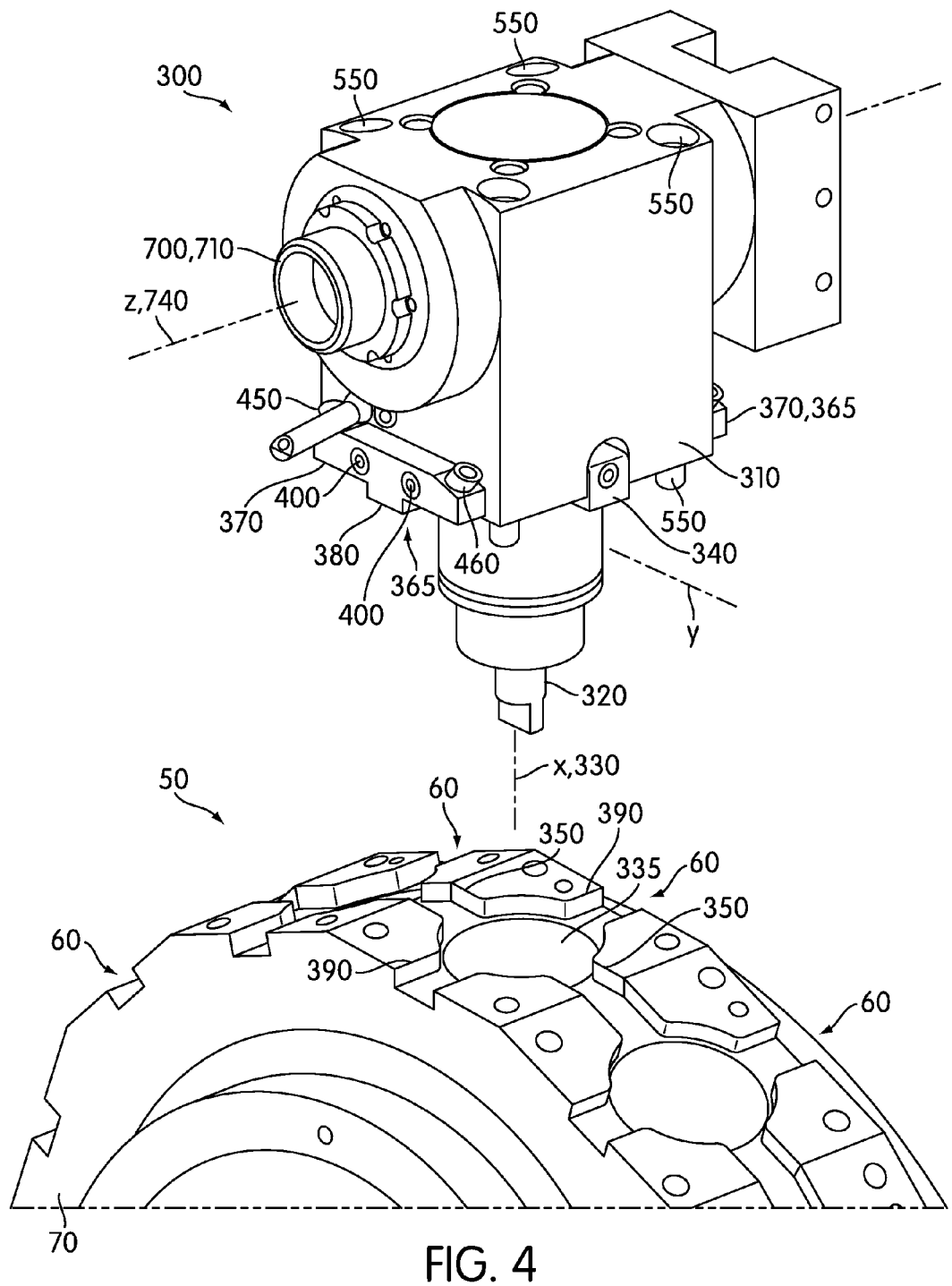
FIG. 4 is an exploded view showing the turret of FIG. 3 and the combination tool holder of FIG. 1.
Figure 10:
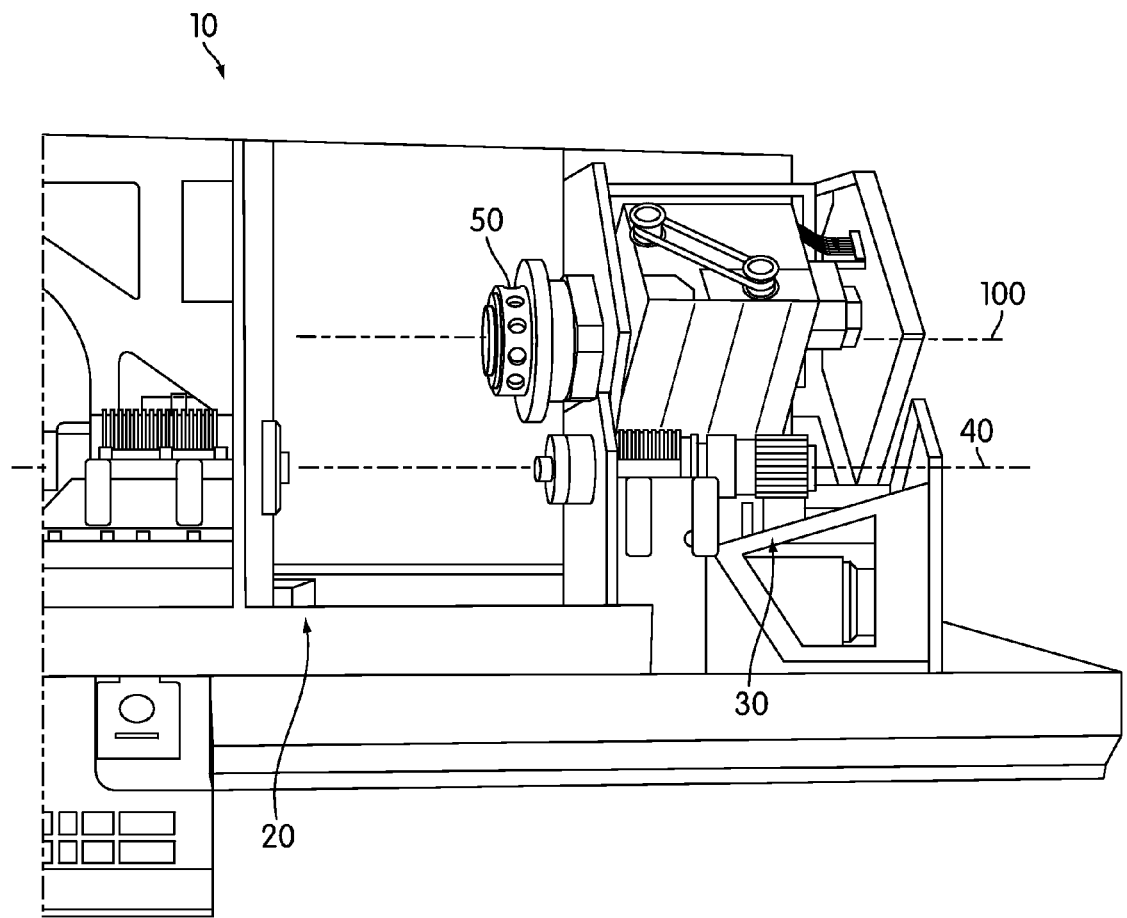
FIG. 10 is a perspective view of a turning/milling center and turret to which the tool holder of FIGS. 1 and 6-9 may be mounted.

As shown in FIG. 10, a machine tool 10 (a turning center as illustrated) comprises a main spindle 20 and a back spindle 30. The spindles 20, 30 are adapted to hold work pieces to be machined by the center 10. The spindles 20, 30 share a common spindle axis 40. As shown in FIGS. 3 and 4, the machine tool 10 includes an indexing turret 50 having a plurality of tool holder stations 60 disposed about a rim 70 of the turret 50. As shown in FIG. 3, a plurality of tool holders 300, 600, 610, 620 mount to respective stations 60. As shown in FIG. 10, the turret 50 is selectively rotatable about a turret pivot axis 100 so as to place a desired one of the tool holders 300, 600, 610, 620 into an operative position in which the tool holder 300, 600, 610, 620 may work on a work piece mounted to one of the spindles 20, 30.

In the illustrated embodiment, the stations 60 are standard BMT stations. However, any other suitable type of turret station may alternatively be used without deviating from the scope of the present invention.

The turret 50 also includes a driving shaft that engages a drive shaft 320 of the tool holder 300, 600, 610, 620 that is in an operative position such that a tool mounted to the tool holder 300, 600, 610, 620 is rotated to facilitate machining or milling of the work piece.

The machine tool 10 and turret 50 may be of any suitable type, as is conventional in the art. For example, the turret 50 may be of the type disclosed in U.S. Patent Application Publication No. 2009/0007406 A1, the entire contents of which are hereby incorporated herein by reference. The machine tool 10 may be of any suitable type, for example a Hardinge RS-Series High-Performance Multi-Tasking Turning Center.

Figure 1:
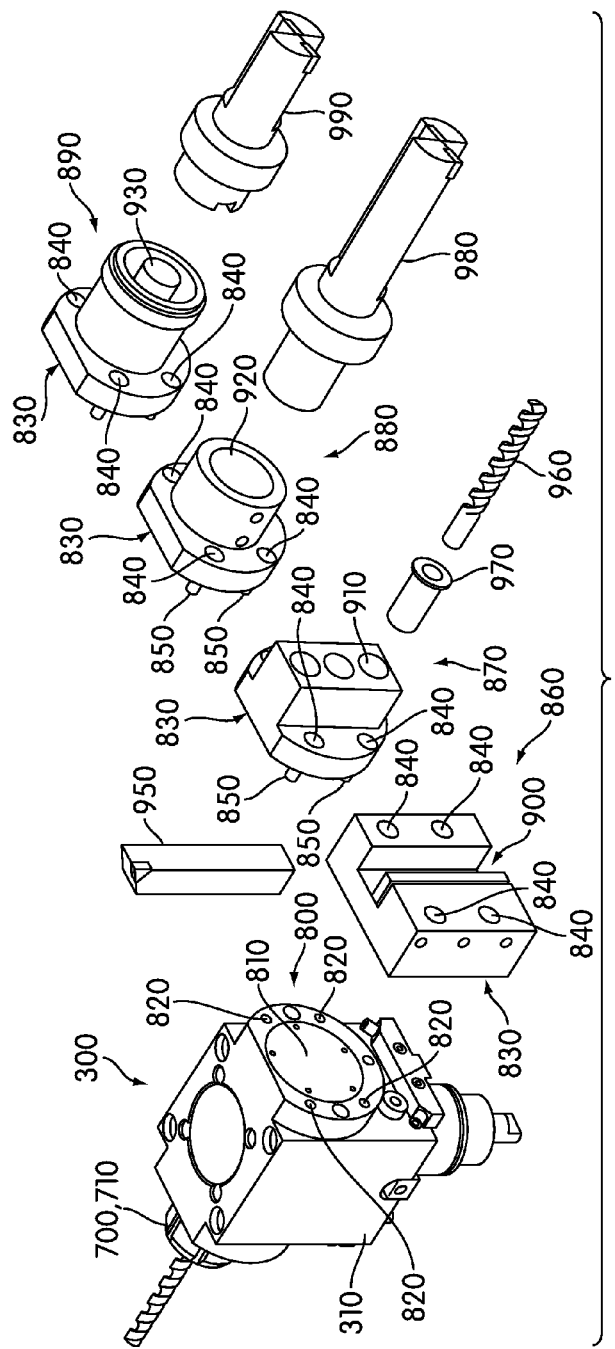
FIG. 1 is a perspective view of a combination live/dead tool holder according to an embodiment of the present invention, with a variety of modular, interchangeable dead tool holders shown in exploded view next to the combination tool holder.

As shown in FIGS. 1 and 4, the tool holder 300 comprises a base 310 and a drive shaft 320. As shown in FIGS. 3-4, the base 310 mounts to one of the stations 60 on the rim 70 of the turret 50. As shown in FIG. 4, the base 310 defines an x-axis that extends radially away from the turret 50 when the base 310 is mounted to the turret 300. The x axis is parallel to the drive shaft 320. The base 310 also defines a z axis that is parallel to a pivotal axis of the turret 50 and spindles 20, 30 when the base 310 is mounted to the turret 50 and perpendicular to the x axis. The base 310 also defines a y axis that is perpendicular to the x and z axes, and extends in a direction tangent to a circumferential direction of the rim 70.

As shown in FIGS. 3 and 4, the drive shaft 320 extends through the base 310 for rotational movement relative to the base 300 about a drive shaft axis 330. When the base 310 is mounted to the rim 70, the drive shaft 330 extends radially into an opening 335 in the station 60 of the rim 70. The drive shaft 320 is configured and shaped so as to be driven by a driving shaft of the turret 50 in any suitable manner, e.g., as shown in U.S. Patent Application Publication No. 2009/0007406 A1.

Figure 5:
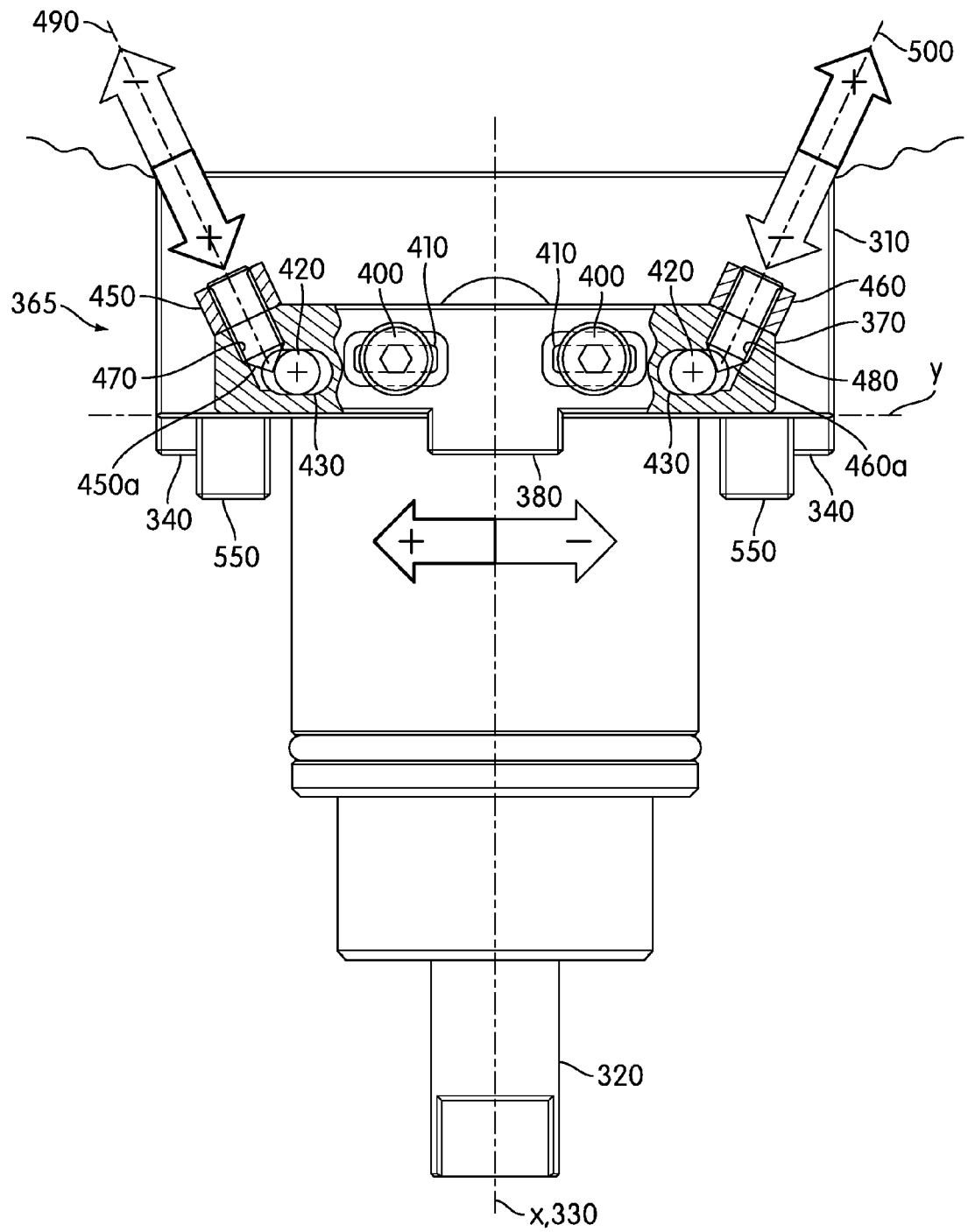
FIG. 5 is a partial, front plan view of the tool holder of FIG. 1.

As shown in FIGS. 4 and 5, two x axis fixed keys 340 connect to the base 310 in fixed positions. When the base 310 is positioned on a station 60, the keys 340 mate with complimentarily shaped x axis keyways 350 in the station 60 to fix the x position of the base 310 relative to the turret 50.

As shown in FIGS. 4 and 5, the tool holder 300 includes two y axis adjustment mechanisms 365. Each y axis adjustment mechanism 365 comprises an adjustable y axis alignment structure 370 adjustably connected to the base 310 so as to be positionable in a plurality of y axis positions relative to the base 310. Each y axis alignment structure 370 has a y axis key 380 that mates with a complimentarily shaped y axis keyway 390 in the station 60. Adjustment of the y axis adjustment mechanisms 365 selectively adjusts a y axis position of the tool holder 300 relative to the station 60 and turret 50.

As shown in FIGS. 4 and 5, the alignment structure 370 is slidably connected to the base 310 via two bolts 400 that extend through slots 410 in the structure 370 and into threaded holes in the base 310. Two pins 420 are fixedly connected to the base 310 and are slidable within slots 430 in the structure 370. The slots 410, 430 are elongated in the y direction to permit the structure 370 to move in the y direction relative to the base 310.

While the slots 410, 430 are elongated in the y direction in the illustrated embodiments, such elongation is omitted in alternative embodiments. For example, in embodiments in which the total y-axis adjustment range (e.g., 0.002 inch) is smaller than a clearance between the bolts 400 and pins 420 and the slots 410, 430 (e.g., 0.01 inch), the slots 410 and/or slots 430 may be round (or any other appropriate shape) such that the y-axis movement of the structure 370 is accommodated by the clearance between such round slots 410, 430 and the bolts 400 or pins 420.

As shown in FIG. 5, the y axis adjustment mechanism 365 also includes two adjustment bolts 450, 460 that are threadingly engaged with threaded holes 470, 480 in the structure 370 such that the bolts 450 can be threaded into and out of the holes 470, 480 along adjustment bolt axes 490, 500. The axes 490, 500 form skewed, acute angles with the x and y axes. Front ends 450a, 460a are tapered and abut respective ones of the pins 420.

Hereinafter, adjustment of the y axis adjustment mechanism 365 is described with reference to FIG. 5.

To adjust the y axis position of the base 310 and tool holder 300 to the right as shown in FIG. 5 relative to the turret 50 (assuming the bolts 450, 460 are in their operatively abutting positions relative to the structure 370), the bolts 400 are first loosened to permit y-axis movement of the structure 370. Next, adjustment bolt 460 is rotated counterclockwise (assuming right hand threads) a desired amount so as to move the end 460a away from the pin 420 and into an operatively retracted position of the bolt 460. The adjustment bolt 450 is then rotated clockwise (assuming right hand threads) through a desired amount, which pushes the base 310 to the right relative to the structure 370, as shown in FIG. 5. Tightening of the bolts 450, 460 helps to lock the structure 370 into the desired y axis position. The bolts 400 are then tightened to further fix the structure 370 in the desired position. The same process is then repeated for the other y axis adjustment mechanism 365. Synchronous adjustment of both y axis adjustment mechanisms 365 ensures that the adjustment results in substantially pure y-axis adjustment, with little or no unwanted rotation of the base 310 about the x axis.

The above explanation explains how to move the tool holder 300 to the right along the y axis relative to the turret 50 as shown in FIG. 5. The tool holder 300 can be moved in the opposite y direction (i.e., to the left as shown in FIG. 5) by flipping which adjustment bolt 450, 460 is operated on in which way.

In some embodiments, the bolts 450, 460 are themselves strong enough to fix the structure 370 in place, in which case the bolts 400 may be eliminated or not used to further secure the structure 370 in place.

The angles of the axes 490, 500 relative to the x, y, and z axes, pitch of the threads of the holes 460, 470 and bolts 450, 460, and relative shapes of the pins 420 and tapered ends 450a, 460a all contribute to what y axis movement will occur per revolution of the bolts 450, 460. Thus, these factors can be set to provide a desired ratio (e.g., 1 bolt 450, 460 revolution per 0.0005 inches y axis movement, 1 bolt 450, 460 revolution per 0.001 inches or less y axis movement). According to one embodiment, the adjustment mechanism provides a total of 0.002 inch of y-axis adjustment.

In the illustrated embodiment, the adjustment mechanism 365 utilizes OD threaded bolts 450, 460. However, any other suitable threaded element may replace the bolts 450, 460 without deviating from the scope of the present invention (e.g., ID threaded nuts).

In the illustrated embodiment, the front ends 450a, 460a of the bolts 450, 460 directly abut the pins 420. However, the bolts 450, 460 may operatively abut the pins 420 without direct contact without deviating from the scope of the present invention (e.g., abutment via an intermediate structure such as a bushing, washer, etc.).

According to alternative embodiments, the pins 420 are eliminated, and the front ends 450a, 460a of the bolts 450, 460 abut a surface of the base 310 or any structure that moves with the base 310 relative to the structure 370.

In the illustrated embodiment, the pins 420 are fixed to the base 310 and the adjustment bolts 450, 460 threadingly engage the structure 370. However, the relative placement of the pins 420 and bolts 450, 460 may be reversed without deviating from the scope of the present invention.

In the illustrated embodiment, the y axis adjustment mechanism 365 utilizes bolts 450, 460 whose rotation adjusts the y axis position of the structure 370. However, a variety of alternative y axis adjustment mechanisms 365 may be used instead without deviating from the scope of the present invention. For example, the pins 420 and bolts 450, 460 may be eliminated altogether. In such an embodiment, the y axis position of the structure 370 is adjusted by loosening the bolts 400, manually sliding the structure 370 to the desired y position, and retightening the bolts 400. Nonetheless, the y axis adjustment mechanism 365 preferably provides for positive y-axis repositioning (as opposed to the free, manual repositioning).

According to an alternative embodiment of the y axis adjustment mechanism, the bolts 450 are replaced by a nut and bolt that are aligned with the y axis. The nut and bolt are mounted to different ones of the structure 370 and base 310, respectively, so as to prevent relative y axis movement between the nut or bolt and the structure 370 or base 310 to which it is mounted. One of the nut and bolt is nonetheless rotatable. Rotation of the rotatable one of the nut and bolt clockwise and counterclockwise moves the structure 370 relative to the base 310 in the positive and negative y directions, respectively. It should be noted that this alternative embodiment will typically provide less fidelity and precision than is possible using the above-described bolts 450, 460.

According to an alternative embodiment, the second bolt 460 is eliminated, and the bolt 450 is operatively connected to the structure 370 so as to always operatively abut the structure 370 such that there is no operatively retracted position of the bolt 450 relative to the structure 370. Consequently, movement of the bolt 450 in the first direction moves the structure 370 in a positive y axis direction, while movement of the bolt 450 in the second, opposite direction moves the structure 370 in the negative y axis direction.

As shown in FIGS. 4 and 5, once the y axis position of the y axis adjustment mechanisms 365 is set and the base 310 is properly aligned with the station 60, a plurality of bolts 550 bolt the base 310 to the station 60 to securely fix the tool holder 300 in place on the turret 50.

In the illustrated embodiment, keys 340, 380 are disposed on the base 310, while keyways 350, 390 are disposed on the station 60. However, the relative positions may be reversed without deviating from the present invention. Indeed, even the keys 340, 380 and keyways 350, 390 may be replaced with key surfaces of other shapes so long as the base 310 includes some type of positive or negative key surface that mates with a complimentary key surface on the station 60. Such mating key surfaces help to ensure proper alignment between the base 310 and turret 50 in the x and y directions.

In the illustrated embodiment, axis adjustment mechanisms 365 are only provided for the y axis. However, according to alternative embodiments, the fixed x-axis keys 340 are replaced with x-axis adjustment mechanisms like the above-discussed y-axis adjustment mechanisms 365. Such x-axis adjustment mechanisms would facilitate selective adjustment of the x axis position of the tool holder 300 relative to the turret 50.

Figure 9:
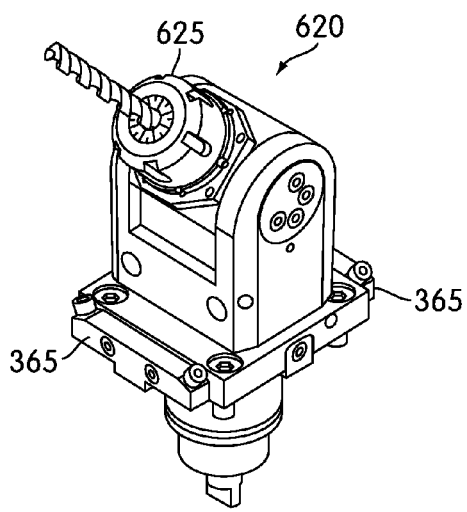

As shown in FIGS. 3 and 6-9, the above-discussed y-axis adjustment mechanisms 365 may be used on a variety of different types of tool holders designed to mount to stations 60 of the turret 50, for example, an x-axis live tool holder 600 with an x-axis live tool mount 605 (FIG. 7), a front/back z-axis live tool holder 610 with front and back z-axis live tool mounts 615 (FIG. 8), and an adjustable axis live tool holder 620 with a live tool mount 625 that adjusts to a selected axis in the x-z plane (FIG. 9).

Figure 6:
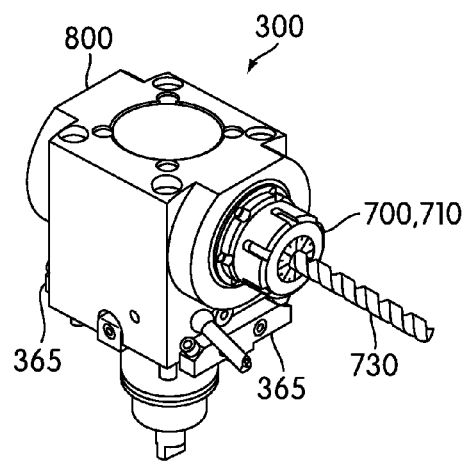
FIGS. 6-9 are perspective views of a variety of tool holders that each include a y-axis adjustment mechanism.
Figure 7:
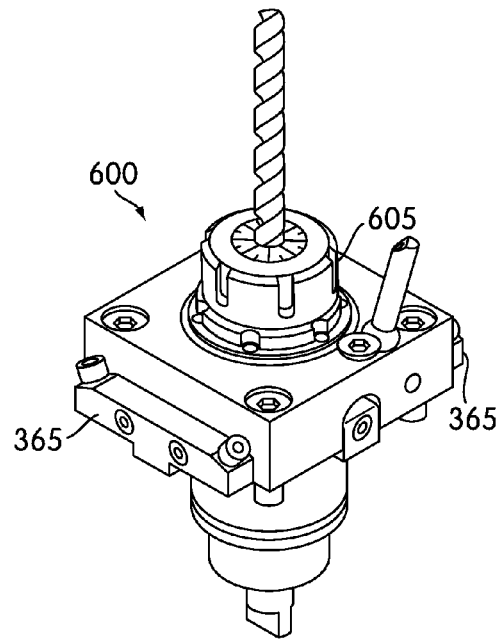
Figure 8:
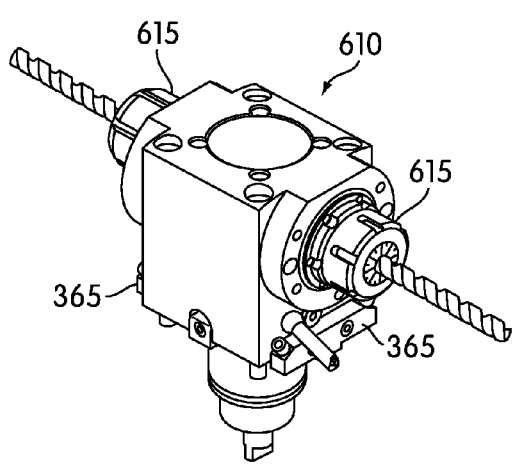

As shown in FIGS. 1, 4, and 6, the tool holder 300 comprises a live tool holder 700 and a dead tool holder mount 800.

The live tool holder 700 comprises a live tool mount 710 constructed and arranged to releasably attach a tool (e.g., a drill bit 730, milling bit, etc.) thereto. The live tool mount 710 is rotatably connected to the base 310 for relative rotation about a live tool axis 740. In the illustrated embodiment, the live tool axis 740 is parallel to the z axis. However, the live tool axis 740 may alternatively extend in a variety of other directions (e.g., the directions shown with respect to the live tool mounts of the tool holders 600, 620).

The live tool mount 710 operatively connects to the drive shaft 320 via a drive train such that rotation of the drive shaft 320 causes the live tool mount 710 to rotate. In the illustrated embodiment, the live tool mount axis 740 is perpendicular to the drive shaft 320. Accordingly, the drive train includes appropriate gearing to make the 90 degree turn (e.g., matching 45 degree bevel gears, a worm gear, etc.). The drive train may include a transmission with any desired drive-shaft:live-tool-mount transmission ration (e.g., 1:4, 1:2, 1:1, 2:1, 4:1).

As best shown in FIG. 1, the dead tool holder mount 800 connects to the base 310 and is adapted to secure any one of a plurality of modular dead tool holders 860, 870, 880, 890 thereto. In the illustrated embodiment, the dead tool holder mount 800 comprises a face 810 with a plurality of threaded holes 820 disposed therein. Each of the modular dead tool holders 860, 870, 880, 890 has a face 830 that is complimentary of the face 810. The faces 830, 810 may have complimentary surface features (e.g., keys and keyways, male and female parts, etc.) that positively align the modular dead tool holder with the tool holder 300 in one or more of the x, y, and z directions and/or one or more pivotal directions. Each modular dead tool holder 860, 870, 880, 890 includes a plurality of bolt holes 840 in a pattern that matches the bolt holes 820. Bolts 850 securely and releasably connect a selected one of the modular dead tool holders 860, 870, 880, 890 to the dead tool holder mount 800. The different modular dead tool holders 860, 870, 880, 890 may be easily interchanged and mounted to the mount 800 via the bolts.

As shown in FIG. 1, each of the modular dead tool holders 860, 870, 880, 890 comprises a tool mount 900, 910, 920, 930. The tool mount 900 is adapted to attach to a square shank turning tool 950. The tool mount 910 is adapted to attach to a drill bit 960 directly or via a bushing 970. The tool mounts 920, 930 are adapted to attach to different types of indexable drill holders 980, 990. Additional modular dead tool holders with different types of tools or tool mounts may additionally be used to mount different types of tools to the dead tool holder mount 800. Thus, the different tool mounts 900, 910, 920, 930 are configured to mount to different types of tools.

As shown in FIGS. 1 and 4, the live tool holder 700 and mount 710 and dead tool holder mount 800 are positioned such that the modular dead tool holder 860, 870, 880, 890 attached to the dead tool holder mount 800 and the live tool holder 700 extend away from the base 310 in opposite z directions such that they face away from each other. Thus, as shown in FIGS. 3, 4 and 10, the tool holder 300 may be mounted to the turret 50 in an orientation in which the live tool mount 710 is disposed on a main spindle 20 z side of the turret 50 to facilitate interaction between a tool mounted to the live tool mount 710 and a work piece mounted to the main spindle 20. Conversely, the dead tool holder mount 800 is disposed on a back spindle 30 z side of the turret 50 to facilitate interaction between a tool mounted to the dead tool mount 800 and a work piece mounted to the back spindle 30. However, the tool holder 300 may be rotated 180 degrees about the x axis to reverse the relative positions of the live tool mount 710 and dead tool holder mount 800.

All of the live and dead tool holders may be provided with internal and/or external coolant via appropriate coolant conduits in or around the turret 50.

Figure 2:
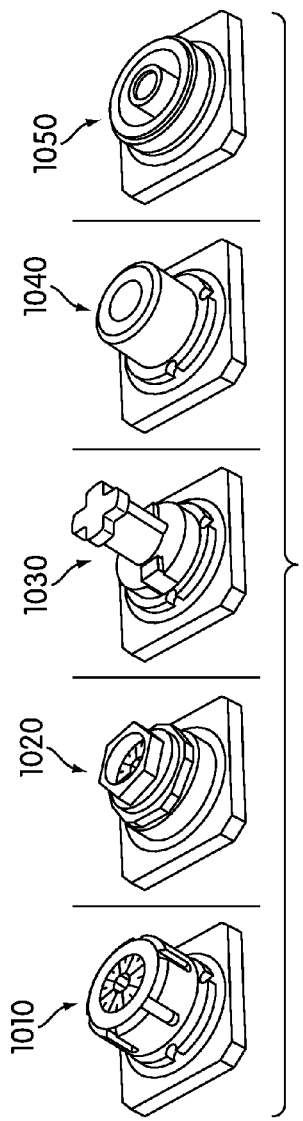
FIG. 2 is a perspective view of a plurality of tool holders that may be mounted to the combination tool holder of FIG. 1.

FIG. 2 illustrates a plurality of different types of tool mounts 1010, 1020, 1030, 1040, 1050 that may be used on either the live tool holders 700 (e.g., in place of the tool mount 710) or the dead tool holders 860, 870, 880, 890 (e.g., in place of the tool mounts 900, 910, 920, 930). The tool mount 1010 is an external collet chuck. The tool mount 1020 is an internal collet chuck. The tool mount 1030 is a shell and milling cutter. The tool mount 1040 is a Weldon system DIN 1835. The tool mount 1050 is an HSK system tool mount.

According to an alternative embodiment, the dead tool holder mount 800 may be replaced with a live tool holder mount through which access to the rotation of the drive shaft 320 is provided. For example, a driven shaft may be accessible through the hole in the face of the live tool holder mount. The driven shaft may be operatively connected to the drive shaft 320. Thus, a live tool holder may be mounted to the live tool holder mount and receive rotational power from the driven shaft. Conversely, any of the above discussed dead tool holders 860, 870, 880, 890 may still be mounted to the live tool holder mount in the same manner as described above with respect to the dead tool holder mount 800. Attachment of one of the dead tool holders 860, 870, 880, 890 may cover an opening by which the driven shaft was accessed so as to protect the drive train and components inside the tool holder 300 and keep lubricant/coolant from leaking out of the access hole.

In the above-described embodiments, various components are described as being "connected" together. Such connection may be of any suitable type (e.g., connected via fastener(s) such as bolts, screws, glue, welds, etc., connected via integral formation such as integral molding, machining from a common blank of material, etc.).

While various components are described and illustrated as being connected to each other via bolts or other types of particular fasteners, such bolts or particular fasteners may be replaced by a variety of other fasteners without deviating from the scope of the present invention (e.g., screws, welds, integral formation, bayonet-style fasteners, etc.).

The foregoing illustrated embodiments are provided to illustrate the structural and functional principles of the present invention and are not intended to be limiting. To the contrary, the principles of the present invention are intended to encompass any and all changes, alterations and/or substitutions within the spirit and scope of the following claims.

What is claimed is:

1. A tool holder comprising:
a base constructed and shaped to be mounted to a rim of an indexing turret of a machine tool, the base defining an x-axis that extends radially away from the turret when the base is mounted to the turret, the base defining a z axis that is parallel to a pivotal axis of the turret, the base defining a y axis that is perpendicular to the x and z axes;
a tool mount for releasably attaching a tool to the tool holder;
an adjustable y axis alignment structure adjustably connected to the base so as to be positionable in a plurality of y axis positions relative to the base, the y axis alignment structure having a y axis key surface positioned and shaped to mate with a complimentary key surface of the turret rim so as to control the y axis position of the base relative to the turret; and
a first threaded element threadingly engaged with one of the base and alignment structure such that rotation of the first threaded element moves the first threaded element along a first threaded element axis relative to the one of the base and the alignment structure,
wherein the first threaded element axis is at a skewed angle relative to the x and y axes, and
wherein the first threaded element operatively abuts the other of the base and alignment structure such that movement of the first threaded element in a first direction along the first threaded element axis forces the y axis alignment structure in a positive y axis direction relative to the base.

2. The tool holder of claim 1, wherein said movement of the first threaded element in the first direction causes the first threaded element to push the other of the base and alignment structure in the positive y axis direction, via the operative abutment between the first threaded element and the other of the base and alignment structure.

3. The tool holder of claim 1, wherein the first threaded element is positioned and arranged relative to the alignment structure such that the alignment structure moves less than 0.001 inches in the positive y axis direction per full rotation of the first threaded element causing movement in the first direction.

4. The tool holder of claim 1, further comprising a second threaded element threadingly engaged with the one of the base and alignment structure such that rotation of the second threaded element moves the second threaded element along a second threaded element axis relative to the one of the base and the alignment structure,
- wherein the second threaded element .axis is at a skewed angle relative to the x and y axes,
- wherein the second threaded element operatively abuts the other of the base and alignment structure such that movement of the second threaded element in a first direction along the second threaded element axis forces the y axis alignment structure in a negative y axis direction relative to the base.

5. The tool holder of claim 1, further comprising a fastener extending between the base and the adjustable y axis alignment structure, wherein fastening of the fastener prevents relative y axis movement between the base and the adjustable y axis alignment structure.

6. The tool holder of claim 1, wherein:
- the adjustable y axis alignment structure comprises a first adjustable y axis alignment structure;
- the tool holder further comprises a second adjustable y axis alignment structure adjustably connected to the base so as to be positionable in a plurality of y axis positions relative to the base, the second y axis alignment structure having a y axis key surface positioned and shaped to mate with a complimentary surface of the turret rim so as to control the y axis position of the base relative to the turret, the first y axis alignment structure being disposed on an opposite z-direction side of the base as the second y axis alignment structure; and
- coordinated adjustment of the first and second adjustable y axis alignment structures causes pure y-axis adjustment.

7. The tool holder of claim 1, in combination with a machine tool, the machine tool comprising:
- an indexing turret having a rim and a turret pivotal axis, the rim having a plurality of tool holder stations, each of the tool holder stations having a y axis key surface; and
- a machining spindle adapted to mount to a work piece to be machined on the machine tool,
- wherein the tool holder is mounted to one of the tool holder stations such that the y axis key surface of the adjustable y axis alignment structures mates with the y axis key surface of the associated tool holder station of the rim,
- wherein the y axis of the base is tangent to a circumferential direction of the turret,
- wherein the z axis of the base is parallel to the turret pivotal axis, and
- wherein the x axis of the base extends in a radial direction of the turret.

8. The tool holder of claim 1, further comprising:
- a drive shaft connected to the base for rotational movement relative to the base about a drive shaft axis, the drive shaft being configured and shaped so as to be driven by a driving shaft of the turret;
- a live tool holder connected to the base, the live tool holder having a live tool mount that is rotatable relative to the base about a live tool holder axis, the live tool mount being shaped and configured to releasably attach a tool to the live tool holder, the live tool mount being connected to the drive shaft such that rotation of the drive shaft rotates the live tool holder;
- a dead tool holder mount connected to the base;
- a modular dead tool holder removably connected to the dead tool holder mount, the modular dead tool holder comprising a dead tool mount for releasably attaching a tool to the dead tool holder.

9. A tool holder comprising:
- a base constructed and shaped to be mounted to a rim of an indexing turret of a machine tool, the base defining an x-axis that extends radially away from the turret when the base is mounted to the turret, the base defining a z axis that is parallel to a pivotal axis of the turret, the base defining a y axis that is perpendicular to the x and z axes;
- a tool mount for releasably attaching a tool to the tool holder;
- an adjustable y axis alignment structure adjustably connected to the base so as to be positionable in a plurality of y axis positions relative to the base, the y axis alignment structure having a y axis key surface positioned and shaped to mate with a complimentary key surface of the turret rim so as to control the y axis position of the base relative to the turret;
- a first threaded element threadingly engaged with one of the base and alignment structure such that rotation of the first threaded element moves the first threaded element along a first threaded element axis relative to the one of the base and the alignment structure between:
  - (i) an operatively abutting position in which the first threaded element operatively abuts the other of the base and alignment structure, and
  - (ii) an operatively retracted position in which the first threaded element does not operatively abut the other of the base and alignment structure; and
- a second threaded element threadingly engaged with the one of the base and alignment structure such that rotation of the second threaded element moves the second threaded element along a second threaded element axis relative to the one of the base and the alignment structure between:
  - (i) an operatively abutting position in which the second threaded element operatively abuts the other of the base and alignment structure, and
  - (ii) an operatively retracted position in which the second threaded element does not operatively abut the other of the base and alignment structure,
- wherein when the first threaded element is in its operatively abutting position, movement of the first threaded element in a first direction along the first threaded element axis forces the y axis alignment structure to move in a positive y axis direction relative to the base,
- wherein when the first threaded element is in its operatively abutting position, the first threaded element prevents the alignment structure from moving in a negative y axis direction unless the first threaded element is moved in a second direction along the first threaded element axis,
- wherein when the first threaded element is in its operatively retracted position, the first threaded element does not prevent the alignment structure from moving in the negative y axis direction,
- wherein when the second threaded element is in its operatively abutting position, movement of the second threaded element in a first direction along the second threaded element axis forces the y axis alignment structure to move in the negative y axis direction relative to the base,
- wherein when the second threaded element is in its operatively abutting position, the second threaded element prevents the alignment structure from moving in the positive y axis direction unless the second threaded element is moved in a second direction along the second threaded element axis, and wherein when the second threaded element is in its operatively retracted position, the second threaded element does not prevent the alignment structure from moving in the positive y axis direction.

10. The tool holder of claim 9, wherein when the first and second threaded elements are both in their operatively abutting positions, the alignment structure can only be moved along the y axis if one of the first and second threaded elements is moved in its respective second direction.

* * * * *